Patented Nov. 23, 1943

2,334,892

UNITED STATES PATENT OFFICE 2,334,892

DYESTUFFS OF THE ANTHRAQUINONE SERIES

Alexander J. Wuertz and Ralph N. Lulek, Wilmington, Del., and William L. Rintelman, Glassboro, N. J., assignors to E. I. du Pont de Nemours & Company, Wilmington, Del., a corporation of Delaware No Drawing. Application May 21, 1941, Serial No. 394,496

2 Claims. (Cl. 260—262)

This invention relates to the preparation of new gray dyestuffs of the anthraquinone series and more particularly to the preparation of alkyl and aryl ethers of pyridazino derivatives of diphthaloyl acridones of the general formula

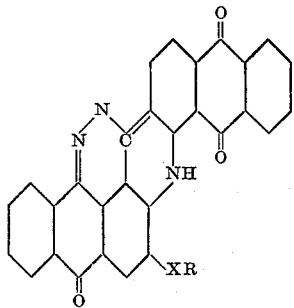

wherein X stands for O or S and R stands for an alkyl radical of not more than 6 C-atoms or an aryl radical of the benzene series.

It is an object of the invention to prepare gray vat dyestuffs of the anthraquinone series of exceptional bleach and light fastness and which will compare favorably in cost with existing dyes of the anthraquinone series.

We have found that new gray dyestuffs which exhibit exceptionally good bleach and light fastness can be prepared by condensing 4'-alkoxy- (aryloxy or similar thio ethers)-3'-amino-benzoyl-benzoic acids with 1-chloro-2-anthraquinone-carboxylic acid and ring closing the resulting substituted benzoylanilido-anthraquinone dicarboxylic acid derivatives to the dianthraquinonyl acridone and then condensing the dianthraquinonyl acridones, which are dyestuffs in themselves, with hydrazine (in the form of its hydrate or sulfate) to give what may be generally termed the pyridazino derivatives of diphthaloyl acridones. These products dye in strong greenish-gray to reddish-gray shades of exceptionally good fastness properties. Their fastness to light, washing, bleaching, power laundry, peroxide bleaching, etc. is excellent. They have good application properties and may be applied to the fiber by the usual dyeing and printing process including the dyeing by the pigment padding method.

The following examples are given to illustrate the type of this new series of dyestuffs. The parts used are by weight:

Example 1

17.5 grams of methoxy-diphthaloyl acridone (made by ring-closing 1-(2'-methoxy-5'-(ortho-carboxy-benzoyl))-anilido-2-anthraquinone carboxylic acid in boiling trichlor-benzene with benzoyl chloride using a trace of sulfuric acid as a catalyst), are suspended in 150 grams of phenol. The charge is heated to from 70 to 80° C. and 5 grams of flake sodium hydroxide are added. The mixture is stirred for about twenty minutes to dissolve the sodium hydroxide and break up the large crystals of the acridone.

10 grams of hydrazine sulfate ($N_2H_4.H_2SO_4$) are then added and the reaction mass is heated to from 100 to 110° C. for 20 hours. The product which consists of small bluish-green needles and hairs can be isolated by filtration. The resulting dyestuff dissolves in 96% sulfuric acid with a bright red coloration and is precipitated in the form of greenish-blue flakes on drowning. It dyes cotton greenish-gray shades from a red-violet vat. Instead of phenol, a mixture of meta and para cresols may be used with equal results.

Example 2

The ethoxy-pyridazino derivative may be obtained in the same manner as the methoxy compound (Example 1) by reacting 2.25 moles of hydrazine sulfate with 1 mole of ethoxy-diphthaloyl acridone, which in turn is made by ring-closing the 1-(2'-ethoxy-5'-(ortho-carboxy-benzoyl))-anilido-2-anthraquinone carboxylic acid with benzoyl chloride in trichlor-benzene. The pyridazino compound is obtained in the form of greenish-blue crystals which dye cotton in greenish-gray shades from a red-violet vat. The shade is somewhat greener than the methoxy compound.

If n-butoxy-diphthaloyl-acridone is used instead of the ethoxy compound (made in a manner analogous to the methoxy derivative) a still greener shade of gray is obtained.

Example 3

18 grams of phenoxy-diphthaloyl acridone (obtained by ring-closing (1-(2'-phenoxy-5'-(ortho-carboxy-benzoyl))-anilido-2-anthraquinone carboxylic acid in boiling trichlor-benzene with benzoyl chloride) are dissolved in 150 grams of molten phenol at 90° C. 5 grams of sodium hydroxide are now added followed by 10 grams of hydrazine sulfate. After several hours heating at from 100 to 110° C. the mass becomes thick with large dark blue needles. The heating is continued for a total of 16 hours and the mass is then diluted with 200 cc. ethyl alcohol. The reaction mass is allowed to cool during the addition. The crystalline product is isolated by filtration at 50–60° C. and the cake washed free of phenol and salts with hot water.

This compound dissolves in 96% sulfuric acid with an intense red-violet coloration and is precipitated in greenish-blue flakes when drowned in water. It dissolves with a red-brown color in the usual alkaline hydrosulfite vat and dyes cotton therefrom a redder shade of gray than do the compounds described in the previous examples. A still redder shade of gray is obtained when the dye is acid pasted with warm sulfuric acid (30–50° C.) in place of the cold sulfuric acid (10–15° C.).

The analogous para-methyl-phenoxy ether is made in an identical manner and is similar in shade and physical properties to the above.

*Example 4*

3.5 grams ethylmercapto-diphthaloyl acridone (made by ring-closing 1-(2'-ethylmercapto-5'- (ortho-carboxy - benzoyl)) - anilino - 2 - anthraquinone carboxylic acid in boiling trichlorobenzene with benzoyl chloride using a trace of sulfuric acid as a catalyst) are suspended in 35 grams of phenol. The charge is heated to 90–100° and 1.8 grams sodium hydroxide are added. The mixture is stirred for a few minutes and then 3.5 grams hydrazine sulfate are added. After heating for two hours, the reaction product consists of crystalline dark blue needles which are isolated by filtration. The product dyes cotton bluish-gray shades from a brown hydrosulfite vat. It dissolves in sulfuric acid with a bluish-red coloration.

The 1-(2'-ethylmercapto - 5'(ortho - carboxy-benzoyl)) anilino-2-anthraquinone carboxylic acid used above is prepared by condensing 1-chloro-2-anthraquinone carboxylic acid with 3'-amino-4'-ethyl-mercapto-ortho benzoyl benzoic acid in aqueous bicarbonate solution in the presence of a copper catalyst. The 3'-amino-4'-ethylmercapto-orthobenzoyl benzoic acid is in turn prepared by an iron reduction in a mixture of acetic and hydrochloric acid upon 3'-nitro-4' - ethylmercapto - orthobenzoyl - benzoic acid. The latter results in excellent yield by reacting ethylmercaptan in dilute alkaline solution with 3'-nitro-4'-chloro-ortho-benzoyl-benzoic acid. It shows a melting range of 172–173° after crystallization from alcohol.

The higher alkylthio ethers of the diphthaloyl acridone and the arylmercapto ethers (thio ethers) may be prepared as above described and be employed in the above example to give new gray dyes of desirable fastness properties.

In the above examples other solvents such as pyridine may be used. Other higher alcohols such as isobutanol or mixtures of alcohols and phenols may also be employed in place of the phenol or cresol specifically mentioned. The temperatures may be varied within wide limits without appreciably affecting the outcome for the reaction takes place readily. In place of the hydrazine sulfate other acid salts of hydrazine, hydrazine hydrate or the free base may be employed.

We claim:

1. The pyridazine derivatives of diphthaloyl acridone of the formula

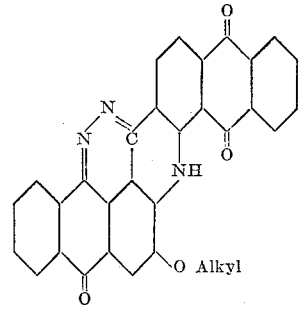

wherein the alkyl radical contains from one to six C-atoms.

2. The pyridazine derivative of diphthaloyl acridone of the formula

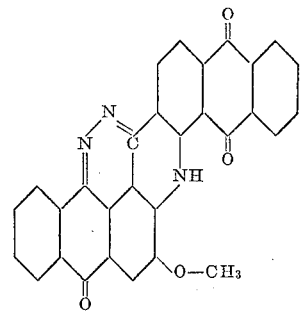

ALEXANDER J. WUERTZ.
RALPH N. LULEK.
WILLIAM L. RINTELMAN.

Certificate of Correction

Patent No. 2,334,892. November 23, 1943.

ALEXANDER J. WUERTZ ET AL.

It is hereby certified that error appears in the printed specification of the above numbered patent requiring correction as follows: Page 1, first column, lines 10–12, for that portion of the formula reading

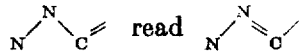

and that the said Letters Patent should be read with this correction therein that the same may conform to the record of the case in the Patent Office.

Signed and sealed this 15th day of February, A. D. 1944.

[SEAL]

HENRY VAN ARSDALE,
*Acting Commissioner of Patents.*